(12) United States Patent
Kobayashi et al.

(10) Patent No.: US 6,225,578 B1
(45) Date of Patent: *May 1, 2001

(54) SWITCH DEVICE

(75) Inventors: Ayumu Kobayashi; Hideshi Sasaki; Kunihiko Sasaki, all of Miyagi-ken (JP)

(73) Assignee: Alps Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/316,448

(22) Filed: May 21, 1999

(30) Foreign Application Priority Data

May 21, 1998 (JP) .................................. 10-140182

(51) Int. Cl.[7] .................................................... H01H 13/70
(52) U.S. Cl. ...................... 200/5 R; 200/6 A; 200/61.54
(58) Field of Search ............................... 200/4, 5 R, 6 A, 200/17 R, 18, 61.54, 61.55, 61.85, 332.1, 332.2; 307/10.1; 400/472, 473, 477, 479, 485, 490, 492; 446/143; 463/36–38

(56) References Cited

U.S. PATENT DOCUMENTS

| 4,516,939 | * | 5/1985 | Crimmins, Jr. ....................... 434/114 |
| 4,638,131 | | 1/1987 | Kidd et al. ......................... 200/61.55 |
| 4,849,732 | * | 7/1989 | Dolenc ..................................... 341/20 |
| 5,585,608 | * | 12/1996 | Kraemer ............................. 200/61.85 |
| 5,721,541 | | 2/1998 | Repp et al. ............................. 341/20 |
| 5,735,693 | * | 4/1998 | Groiss .................................. 434/157 |
| 5,855,144 | * | 1/1999 | Parada ................................... 74/552 |
| 5,945,646 | * | 8/1999 | Miller et al. ......................... 200/5 R |

* cited by examiner

*Primary Examiner*—Michael Friedhofer
(74) *Attorney, Agent, or Firm*—Brinks Hofer Gilson & Lione (57) ABSTRACT

A switch device including a first switch section which is operated to carry out a switching operation by movement of a movable member, and a second switch section with a plurality of operating switches mounted on the movable member. By operating the first switch section to carry out a switching operation, the functions provided by the second switch section can be changed. The switch device of the invention, used for a vehicle steering switch unit or the like, provides many operating switch functions with a small number of operating switches. Therefore, the switch device can be easily operated.

11 Claims, 8 Drawing Sheets

SWITCH DEVICE

BACKGROUND OF THE INVENTION

1. Field of the Invention

The present invention relates to a suitable switch device used, for example, for a steering switch unit provided at a steering pad of a vehicle.

2. Description of the Related Art

In recent years, various electronic controls, ranging from audio components to drive computers, air conditioner sets, and the like, have been placed in vehicles. Conventionally, electronic control operating switches have been provided so as to be concentrated at the instrument panel (to which various gauges are mounted), making the operation of the operating switches very complicated.

Therefore, although conventionally only a horn switch needed to be provided at the steering pad (formed at the center portion of the steering wheel), it is now necessary to provide a steering switch unit, having switches for operating an air conditioner and audio components, at the steering pad as well.

Figure 8:
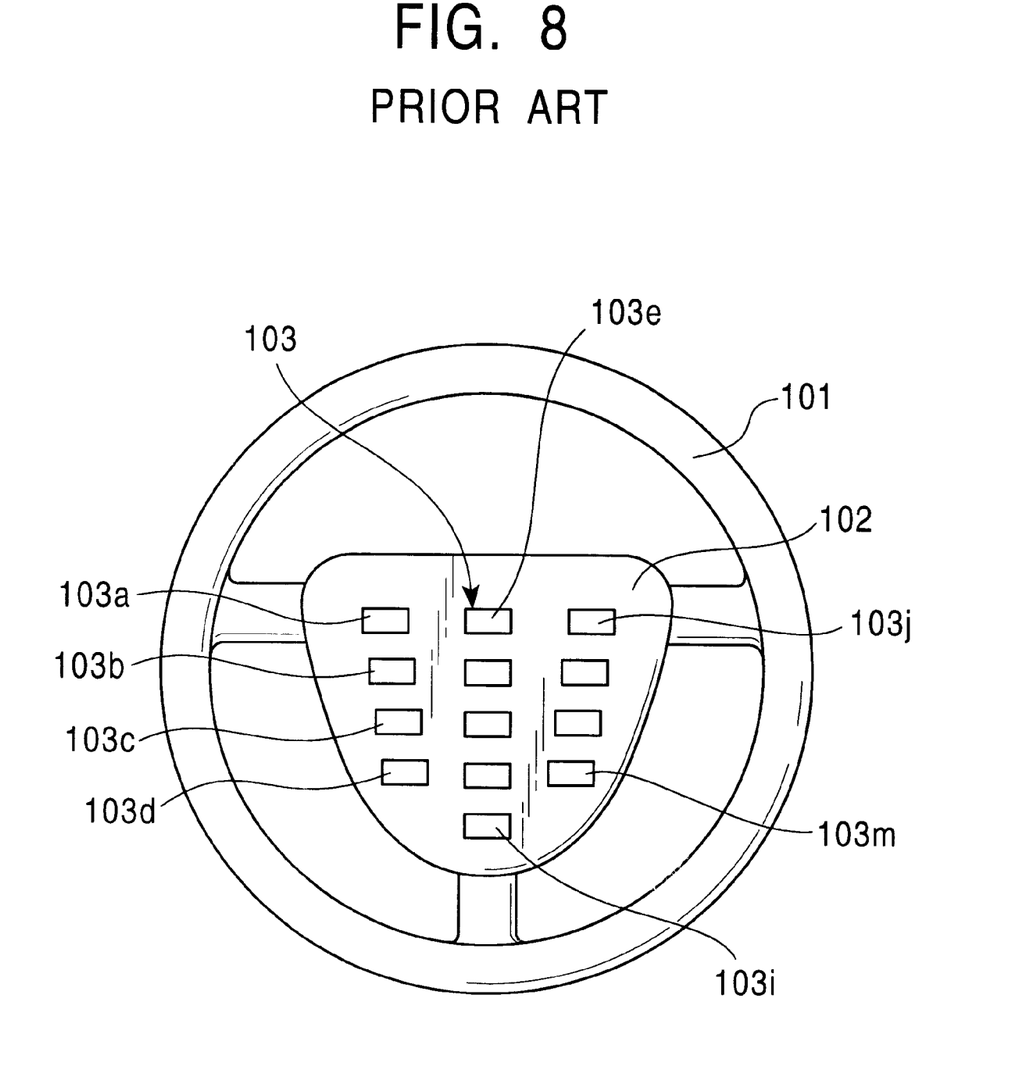
FIG. 8 is a plan view of a conventional switch device used for a steering switch unit.

FIG. 8 illustrates a conventional steering switch unit.

In FIG. 8, reference numeral 101 denotes a steering wheel, reference numeral 102 denotes a steering pad mounted to the center portion of the steering wheel 101, and reference numeral 103 denotes a steering switch unit having various operating switches 103a to 103m.

The operating switches 103a, 103b, 103c, and 103d of the steering switch unit 103 are used to operate an air conditioner. More specifically, they are used as mode change-over switches to switch modes, such as an ON/OFF mode, DEF mode, VENT mode, BI-LEVEL mode, etc. The operating switches 103e to 103m are used to operate an audio component. More specifically, they are used, for example, for turning the audio component on and off; for switching among radio, compact disk (CD), and minidisk (MD) function modes; for switching between AM and FM radio modes; switching between reception frequency up and down modes; or changing disks.

However, the above-described conventional steering switch unit has the following two problems.

First, since the above-described conventional steering switch unit has many operating switches mounted to a steering pad, it is difficult for the user to remember the functions of the operating switches.

Second, since the driver, while driving his or her vehicle, needs to press one operating switch from among many operating switches, the driver needs to look at the operating switch he or she is about to press in order to make sure that the desired switch is about to be pressed.

SUMMARY OF THE INVENTION

In view of the above-described conventional problems, it is an object of the present invention to provide a switch device which allows a large number of operating switch functions to be easily provided with a small number of operating switches.

To this end, according to a first aspect of the present invention, there is provided a switch device comprising:
- a first switch section operated to carry out a switching operation by movement of a movable member; and
- a second switch section with a plurality of operating switches mounted on the movable member;
- wherein when the first switch section is operated to carry out a switching operation, a function provided by the second switch section is changed.

According to a second aspect of the present invention, there is provided a switch device comprising:
- a first switch section affixed to a steering pad, the first switch section including a stationary contact portion and a movable contact portion; and
- a second switch section affixed to the movable member provided at the first switch section, the second switch section including a plurality of operating switches;
- wherein the movable member and the second switch section move integrally; and
- wherein when the first switch section is operated to carry out a switching operation, a function of the second switch section is changed.

In one form of the first aspect of the present invention, the second switch section may be provided at the upper side of the steering pad.

In one form of the second aspect of the present invention, the movable member and the second switch section may be operated in a direction parallel to the upper side of the steering pad.

In the switch device of the first aspect, in which the second switch section is provided at the upper side of the steering pad, the movable member and the second switch section may be operated in a direction parallel to the upper side of the steering pad.

In another form of the first aspect of the present invention, the movable member may have a self-returning structure.

In another form of the second aspect of the present invention, the movable member may have a self-returning structure.

In the switch device of the first aspect, in which the second switch section is provided at the upper side of the steering pad, the movable member may have a self-returning structure.

In the switching device of the second aspect of the present invention, in which the movable member and the second switch section are operated in a direction parallel to the upper side of the steering pad, the movable member may have a self-returning structure.

In the switching device of the first aspect of the present invention, in which the second switch section is provided at the upper side of the steering pad, and the movable member and the second switch section are operated in a direction parallel to the upper side of the steering pad, the movable member may have a self-returning structure.

DESCRIPTION OF THE PREFERRED EMBODIMENTS

A description will now be given of preferred embodiments of the switch device in accordance with the present invention with reference to the drawings, taking a steering switch unit as an example.

Figure 1:
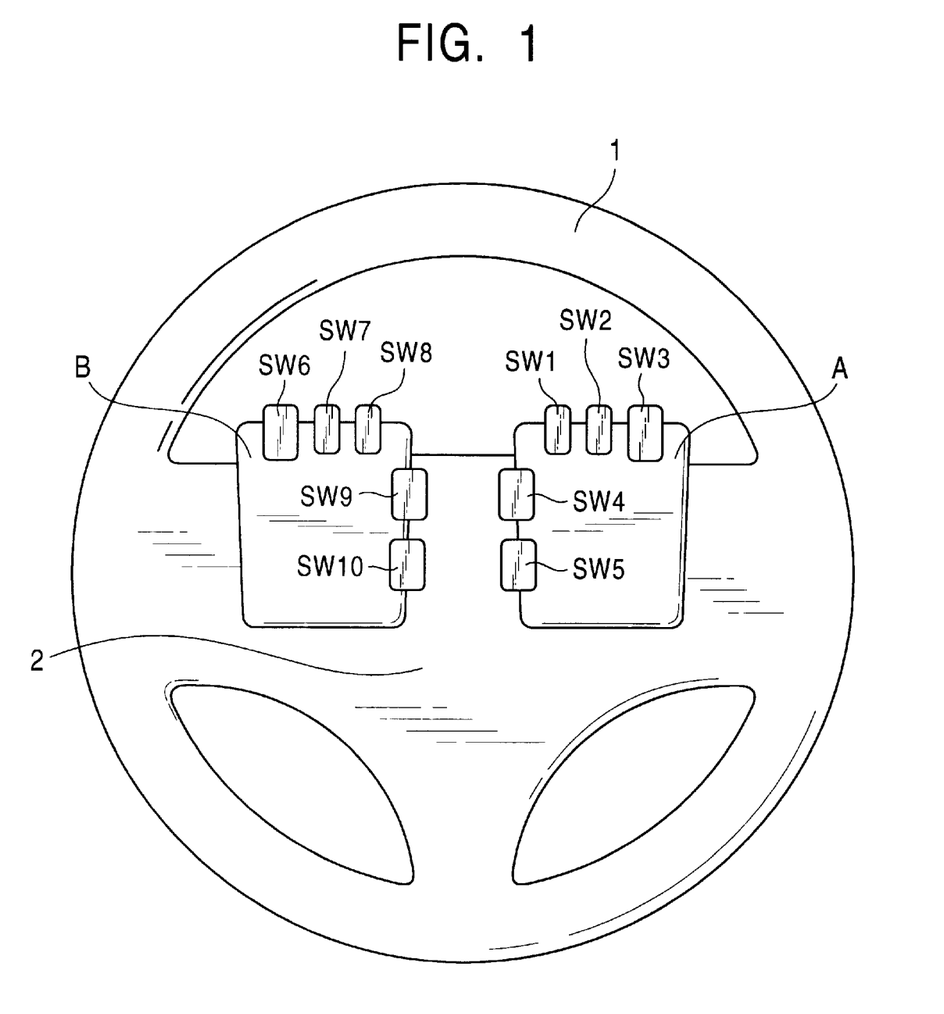
FIG. 1 is a plan view of a first embodiment of the switch device used for a steering switch unit in accordance with the present invention.
Figure 2:
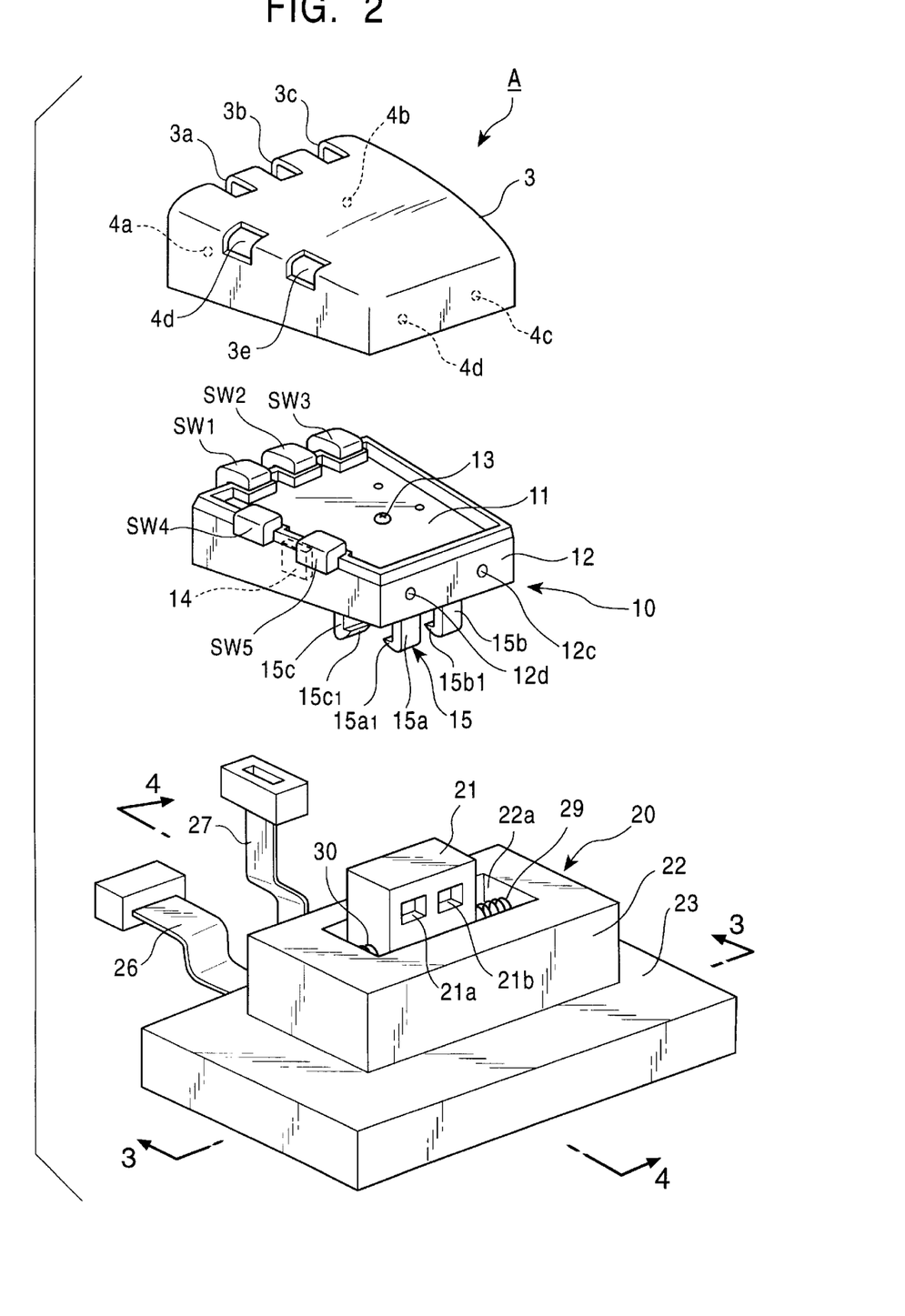
FIG. 2 is an exploded perspective view of the switch device of FIG. 1.
Figure 3:
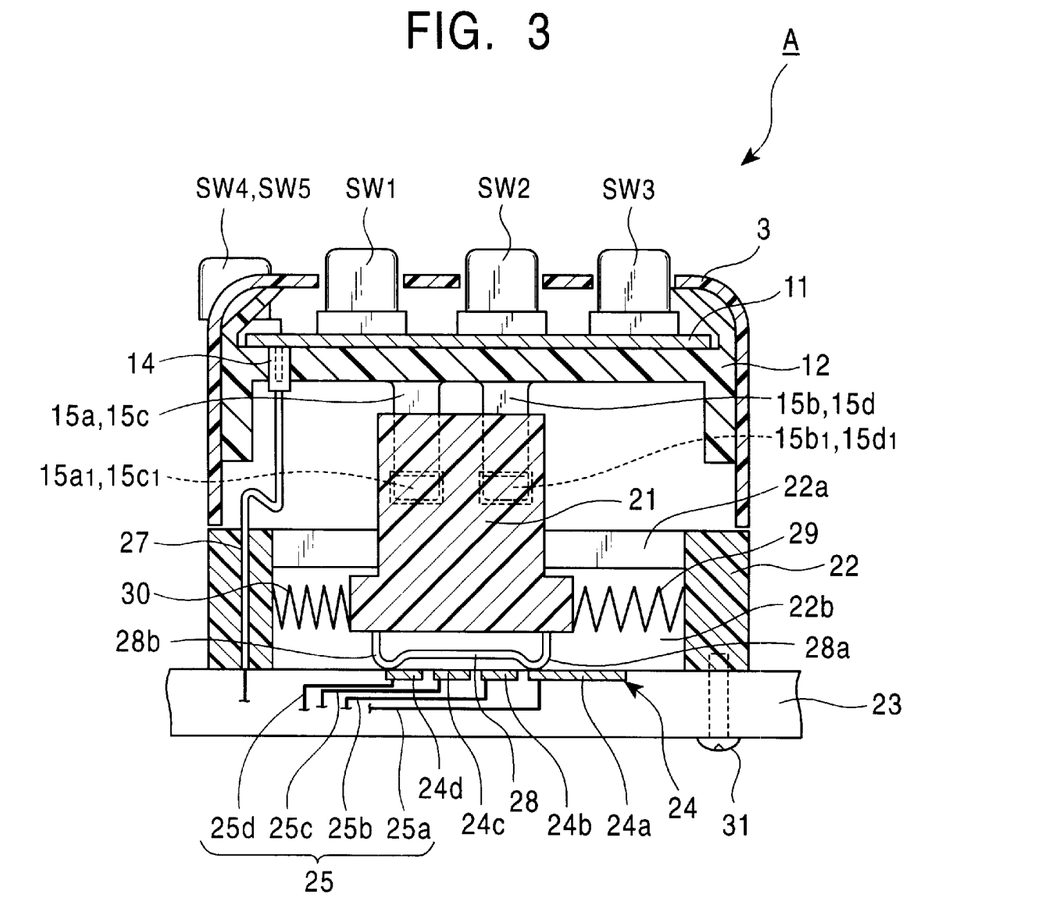
FIG. 3 is a sectional view of the main portion of the switch device taken along line 3—3 of FIG. 2.
Figure 4:
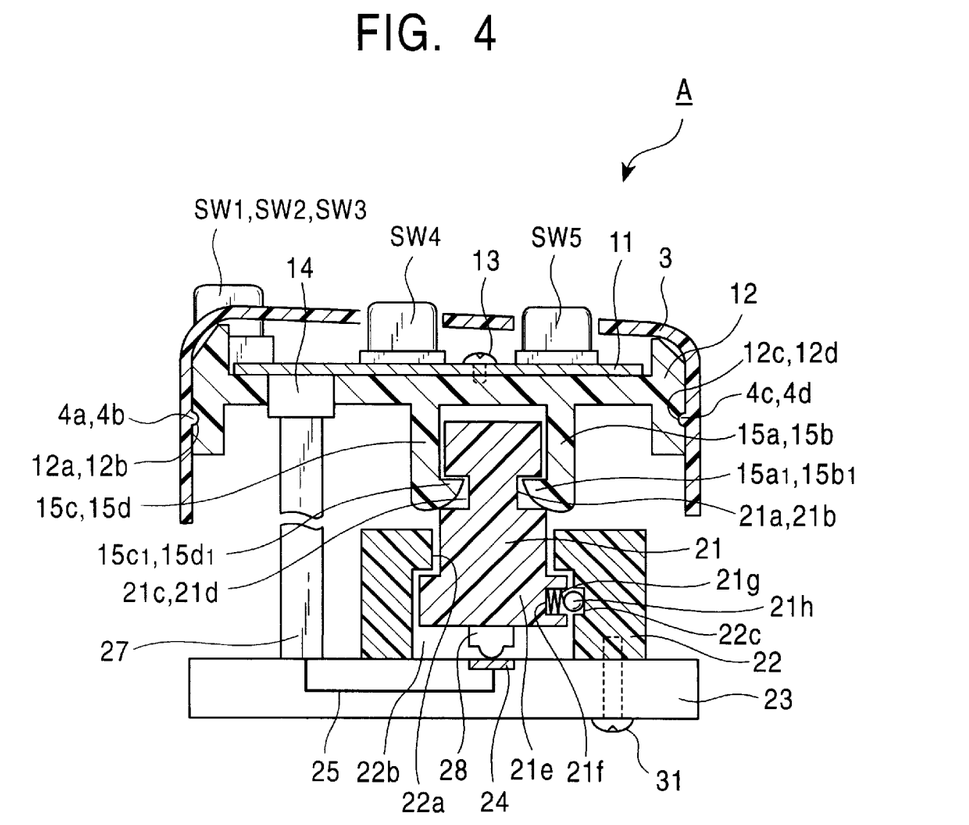
FIG. 4 is a sectional view of the main portion of the switch device taken along line 4—4 of FIG. 2.

FIG. 1 is a plan view of a steering switch unit of the present invention. FIG. 2 is an exploded perspective view of the steering switch unit of FIG. 1. FIG. 3 is a sectional view taken along line 3—3 of FIG. 2. FIG. 4 is a sectional view taken along line 4—4 of FIG. 2.

As shown in FIG. 1, the steering switch unit of the present invention comprises a steering switch unit portion A and a steering switch unit portion B, both of which are mounted to a steering pad 2 of a vehicle steering wheel 1 so as to be disposed symmetrically on the left and right sides of the steering pad 2.

The steering switch unit portion A is mounted at the right upper side of the steering pad 2, and is used for operating audio components. Operating switches SW1 to SW5 are provided at the upper side of the steering switch unit portion A, whereas, as shown in FIG. 2, a slide switch section 20 is mounted at the lower side of the steering switch unit portion A. The slide switch section 20 is mounted to the steering wheel 1 by a metallic fixture (not shown).

Similarly, the steering switch unit portion B is mounted to the left upper side of the steering pad 2, and is used for operating an air conditioner. It comprises operating switches SW6 to SW10 provided at a slide switch section (not shown).

The steering switch unit portions A and B are symmetrically formed on the left and right sides of the steering pad 2. Therefore, only a description of the structure of the steering switch unit portion A is given below, with reference to FIGS. 2 to 4.

Referring to FIG. 2, the steering switch unit portion A comprises a cover 3, a switch block 10, and a slide switch section 20.

The cover 3 is formed of a synthetic resin. It has a rounded top face, and has an open bottom for allowing mounting of the switch block 10 thereto.

In order to allow operation of the operating switches SW1 to SW5 on the switch block 10 from above the cover 3, holes 3a, 3b, 3c, 3d, and 3e are formed in the cover 3 in correspondence with the locations of the operating switches SW1 to SW5.

In order to allow mounting of the cover 3 to the switch block 10, protrusions 4a, 4b, 4c, and 4d are provided at four locations of the inside face of the cover 3. These protrusions 4a, 4b, 4c, and 4d are fitted respectively to recesses 12a, 12b, 12c, and 12d (formed in a mounting frame 12 described later), in order to secure the cover 3 to the switch block 10.

The switch block 10 has mounted thereto the operating switches SW1 to SW5 for operating audio components. The operating switches SW1 to SW5 are ordinarily tact switches, but may be seesaw switches, rocker switches, or rotary switches, as required.

The operating switches SW1 to SW5 are affixed to the front side of a switch base 11 by soldering or the like. The switch base 11 is secured to the mounting frame 12 with a screw 13. A connector 14 is mounted to the back side of the base 11 in order to allow transmission of input signals from the operating switches SW1 to SW5 towards a controller.

A downwardly protruding mounting section 15, used for mounting the switch block 10 to the slide switch section 20, is formed at the bottom face of the mounting frame 12.

The mounting section 15 comprises four flexible engaging pieces 15a, 15b, 15c, and 15d, which have wedge-shaped engaging portions 15a1, 15b1, 15c1, and 15d1, respectively, at corresponding ends thereof.

As shown in FIG. 4, by engaging the engaging portions 15a1, 15b1, 15c1, and 15d1 with respective engaging holes 21a, 21b, 21c, and 21d (formed in a slider 21 acting as a movable member in the slide switch section 20 described later), the switch block 10 is secured to the slide switch section 20.

The slide switch section 20 comprises the slider 21, a guide frame 22, and a mounting base 23. The slider 21 has a movable contact portion and acts as a movable member. The guide frame 22 is used to guide the slider 21 in the direction of movement. The mounting base 23 has a stationary contact portion, with the guide frame 22 being affixed to the mounting base 23.

The mounting base 23 is formed of a synthetic resin, and is mounted to a metallic fixture provided at the steering pad (not shown). As shown in FIGS. 3 and 4, a stationary contact portion 24 is formed at the top face of the mounting base 23. Through the stationary contact portion 24, a connecting terminal 25 is wired inside the mounting base 23, and connected to a flat cable 26 connected to the controller side (not shown).

A flat cable 27, connected to the connector 14 provided at the switch block 10, is mounted to the mounting base 23, and is connected to the flat cable 26.

The guide frame 22 is mounted onto the mounting base 23 with a mounting screw 31. It is a block with an open bottom, and with a guide groove 22a in the top face thereof. A recess 22b is formed in the guide frame 22 to allow movement of the slider 21 therein. When the slider 21 has moved in the guide frame 22, return springs 29 and 30 causes it to return to its original, center position. A click groove 22c is formed in the center of the inside wall face of the guide frame 22.

The slider 21 is formed of a thick plate of synthetic resin. It has a wide portion 21e with a width larger than the guide groove 22a of the guide frame 22 in order to prevent the slider 21 from being dislodged above the guide frame 22 when the lower portion of the slider 21 moves in the guide frame 22. A substantially W-shaped movable contact portion 28 is formed at the bottom surface of the slider 21. The return springs 29 and 30 are inserted between the sides of the wide portion 21e, extending in the direction of movement of the wide portion 21e, and the guide frame 22. They cause the slide 21 to move back to the center position whenever the slider 21 has moved. A coil spring 21g and a ball 21h are inserted into a hole 21f, provided in a side face of the wide portion 21e of the slider 21, in order to provide a tactile feel when the guide frame engages and disengages the click groove 22c.

The engaging holes 21a, 21b, 21c, and 21d, are formed in four locations of the upper portion of the slider 21. When the engaging portions 15a1, 15b1, 15c1, and 15d1 of the switch block 10 engage their respective engaging holes 21a, 21b, 21c, and 21d, the switch block 10 and the slide switch section 20 are secured together.

The stationary contact portion 24, provided at the mounting base 23, comprises a common contact 24a, and three change-over contacts 24b, 24c, and 24d. The common contact 24a and the change-over contacts 24b, 24c, and 24d, are connected to respective connecting terminals 25a, 25b, 25c, and 25d. The connecting terminals 25a to 25d are connected to the wires of the flat cable 26.

In the movable contact portion 28 which comes into contact with the stationary contact portion 24, one of the substantially W-shaped protrusions (protrusion 28a) comes into contact with the common contact 24a, while the other of the substantially W-shaped protrusions (protrusion 28b) comes into contact with the change-over contacts 24b, 24c, or 24d, when the slider 21 moves.

When the protrusion 28b of the movable contact portion 28 is in contact with the change-over contact 24c, the slider 21 is at its neutral position. When the protrusion 28b of the movable contact portion 28 is in contact with the change-over contact 24b or 24d, the return springs 29 and 30 causes it to return to its neutral position. Accordingly, the structure of the movable contact portion 28 is a self-returning structure.

A description will now be given of the operation of the steering switch unit portion A, acting as audio component operating switch unit, having the above-described structure.

The slide switch section (first switch section) 20 is used to select audio components, in which, for example, a radio is connected to the change-over contact 24b, a compact disk (CD) player is connected to the change-over contact 24c, and a minidisk (MD) player is connected to the change-over contact 24d. In this case, as shown in FIG. 3, when the slider 21 is at its neutral position, the CD player is connected to the change-over contact 24c. When the user moves the entire cover 3 with his or her hand towards the left, connection is made to the MD player. On the other hand, when the user moves it towards the right, connection is made to the radio. When the user lets go of the cover 3, the slider 21 automatically returns to its neutral position.

The operating switches of the switch block (second switch section) 10 are allocated the following functions (given in Table 1) in accordance with the audio component selected by the slide switch section 20.

When the functions provided by the operating switches SW1 to SW5 for the audio component modes are compared, the functions provided by the operating switches SW1, SW2, and SW3, are similar for the audio component modes, and the functions provided by the operating switches SW4 and SW5 are exactly the same for the audio component modes.

Similarly, when, for example, the MD player mode is selected by the switch section 20, and the user operates the operating switch SW1, the desired MD track can be selected. When the user operates the operating switch SW2, the same piece of music can be played again. When the user operates the operating switch SW3, he or she can change disks by auto changer operation. When the user operates the operating switch SW4, he or she can turn up the volume of the MD player. When the user operates the operating switch SW5, he or she can turn down the volume of the MD player.

Accordingly, when the five functions provided by the operating switches SW1 to SW5 and the three functions provided by the slide switch section 20 are combined, a total of fifteen functions can be provided.

The five functions provided by the operating switches for the audio component modes are essentially the same. Therefore, in order to achieve the fifteen functions, it is not necessary to remember fifteen functions. It is only necessary to remember five functions. Consequently, the functions can be easily remembered. In addition, the operating switches protrude slightly from the surface of the cover 3, so that the user can feel them with his or her fingers. In addition, the operating switches are placed ergonomically in correspondence with the positions of the five fingers, so that it is not necessary to check which operating switch is being pressed every time operating switches are being operated.

As regards the three functions provided by the slide switch section 20, a self-returning structure is used, so that when the function provided by the slide switch section 20 when the slider 21 is at its neutral position is remembered, the other two functions provided thereby when the slider 21 is on the left or right side of its neutral position can be easily remembered. Therefore, the user can correctly operate the slider switch section 20 by feeling it with his or her fingers. Consequently, when the user, during driving, operates the steering switch unit, he or she no longer needs to check the operating switch he or she is about to press with his or her eyes.

TABLE 1

| Operating Device | SW1 | SW2 | SW3 | SW4 | SW5 |
| --- | --- | --- | --- | --- | --- |
| Radio | Station Selection | Search | AM/FM | Volume Up | Volume Down |
| CD | Track Selection | Repeat | Disk Change | | |
| MD | Track Selection | Repeat | | | |

As regards the functions of the operating switches SW1 to SW5 given in Table 1, when, for example, the radio mode is selected by the slide switch section 20, and the user operates the operating switch SW1, he or she can listen to the preset broadcasting station receiving a predetermined frequency. When the user operates the operating switch SW2, he or she can search for the various reception frequencies. When the user operates the operating switch SW3, he or she can switch between FM and AM modes. When the user operates the operating switch SW4, he or she can turn up the volume of the radio. When the user operates the operating switch SW5, he or she can turn down the volume of the radio.

When, for example, the CD player mode is selected by the slider switch section 20, and the user operates the operating switch SW1, the desired CD track can be selected. When the user operates the operating switch SW2, the same piece of music can be played again. When the user operates the operating switch SW3, he or she can change disks by auto changer operation. When the user operates the operating switch SW4, he or she can turn up the volume of the CD player. When the user operates the operating switch SW5, he or she can turn down the volume of the CD player.

When an operating switch providing a completely different function is required, a display function, which allows the switch and the completely different function to be displayed at a front portion made of glass, is provided, so that the user can operate the operating switch on the steering wheel without looking at it.

Figure 5:
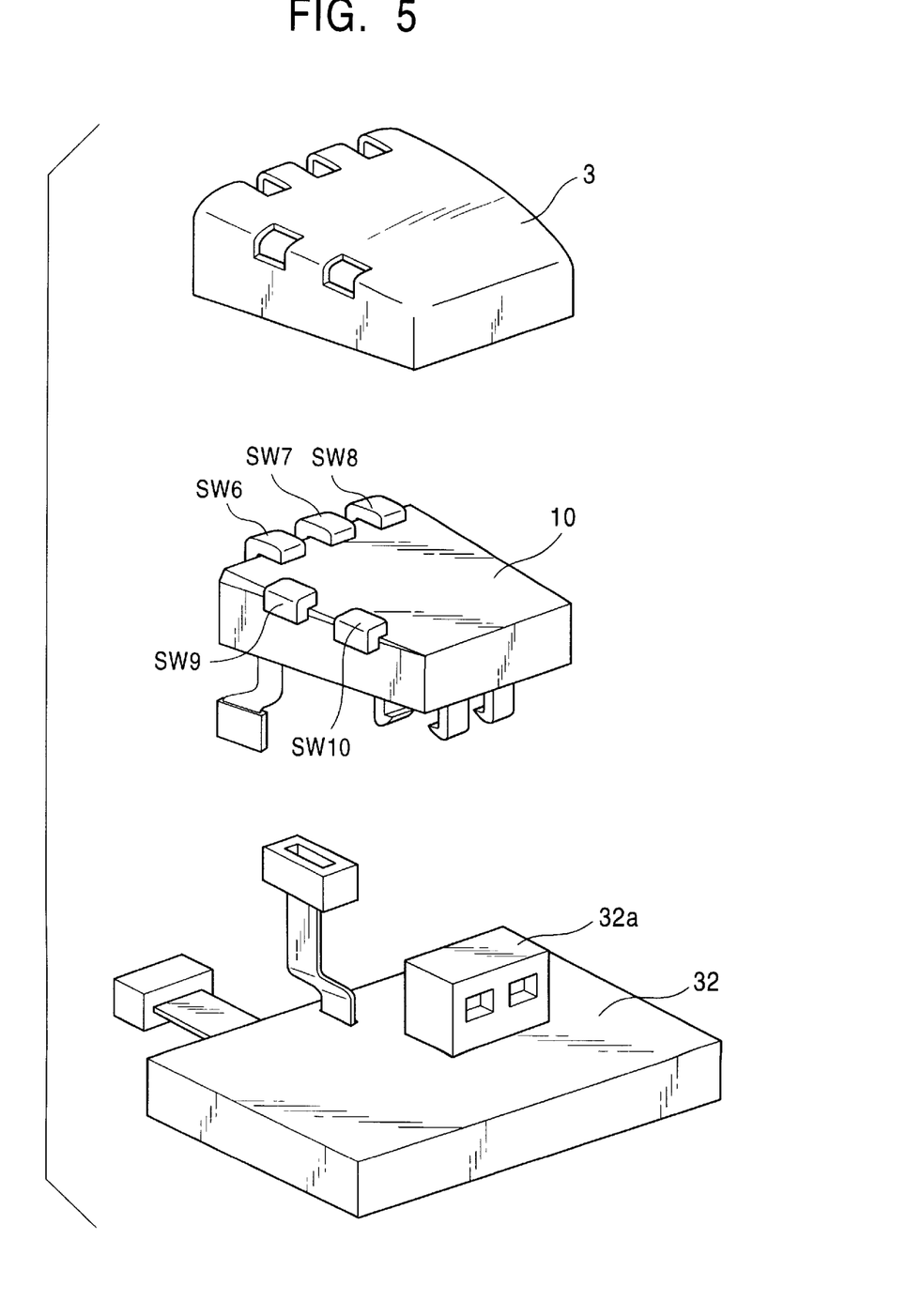
FIG. 5 is an exploded perspective view of another switch device of the present invention.

As mentioned above, the steering switch unit portion B has essentially the same structure as the steering switch unit portion A, and the steering switch units A and B are symmetrically disposed on the left and right sides of the steering pad 2. When the operating functions are simple, the steering switch unit may have a simpler structure, as shown in FIG. 5. In the structure, the slide switch section 20 of the above-described steering switch unit portion A is omitted. The switch block 10 is mounted directly to a projection 32a mounted to a base 32.

When the steering switch unit is used, for example, to operate an air conditioner, only five operation functions, such as air conditioner ON/OFF functions, VENT functions, DEF functions, BI-LEVEL functions, are required, so that the five operation functions are allocated to the five operating switches SW6, SW7, SW8, SW9, and SW10, respectively.

Figure 6:
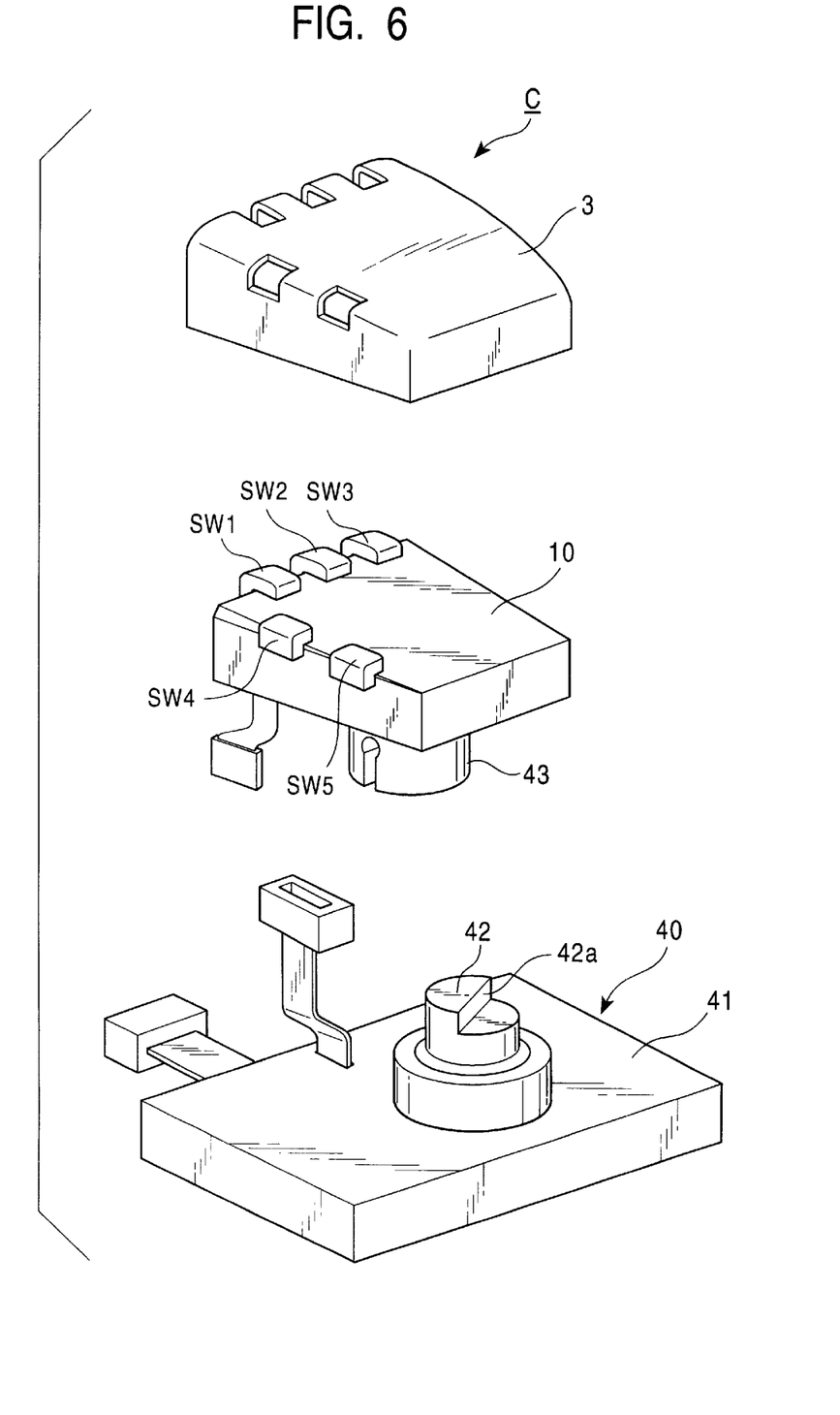
FIG. 6 is an exploded perspective view of another embodiment of the switch device in accordance with the present invention.

FIG. 6 illustrates a steering switch unit C of another embodiment of the present invention. The steering switch unit C comprises a rotary switch section 40 instead of the slider switch section 20 of the above-described steering switch unit portion A. A stationary contact portion (not shown) is provided along the circumferential direction in a mounting base 41. A movable contact portion (also not shown) is provided at the bottom end of a rotary shaft 42 so as to come into slidable contact with the stationary contact portion.

In order to mount a switch block 10 onto the top portion of the rotary shaft 42, an engaging portion 42a is formed at the rotary shaft 42 formed by cutting a portion thereof. When it engages a mounting portion 43 of the switch block 10, the switch block 10 is secured to the rotary switch section 40.

When the steering switch unit C is used to operate audio components, the rotary switch section 40, functioning as a first switch section, is used to select an audio component. The operating switches of the switch block 10, functioning as a second switch section, are used to adjust the volume or the like, in accordance with the audio component selected by the rotary switch section 40, thereby facilitating operations.

In the rotary switch section 40, variable resistors, instead of switch contacts, may also be used.

Figure 7:
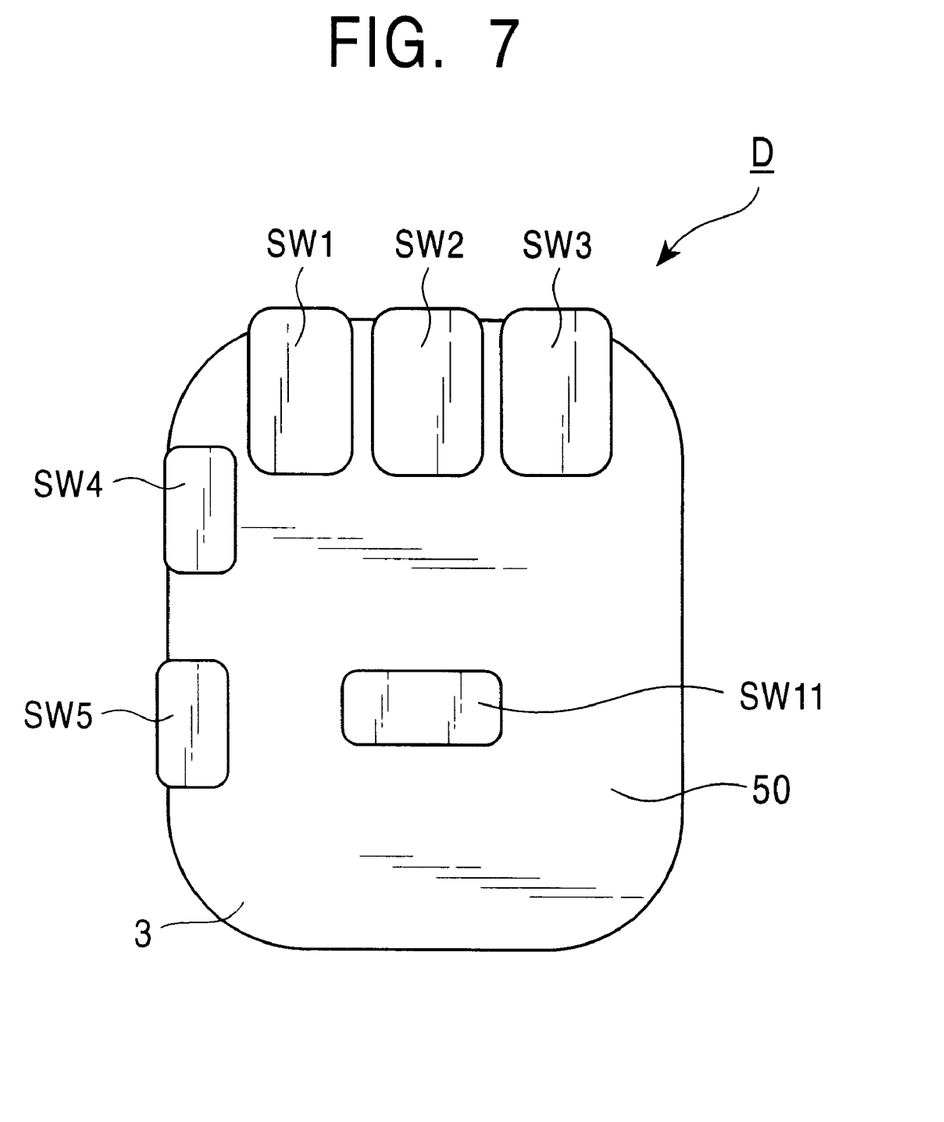
FIG. 7 is a plan view of another embodiment of the switch device in accordance with the present invention.

FIG. 7 illustrates the steering switch unit D of still another embodiment of the present invention. The steering switch unit D comprises, in addition to five operating switches SW1 to SW5, an operating switch SW11 at the center thereof. When the steering switch unit D is used to operate audio components, the operating switch SW11 is used to turn the power supply on and off, so that operations can be more conveniently carried out.

As can be understood from the foregoing description, the switch device of the present invention comprises a first switch section used to carry out a switching operation by movement of a movable member, and a second switch including a plurality of operating switches mounted on the movable member. By operating the first switch section to carry out a switching operation, the functions provided by the plurality of operating switches of the second switch section can be changed. Therefore, the number of change-over operations can be made greater than the total number of switches. In addition, the second switch section is provided at the movable member, and the first switch section is disposed so that a switching operation can be performed as a result of movement of the movable member. Therefore, the user can operate the second switch section without letting go of the movable member after moving the movable contact member with his or her hand and operating the first switch section to perform a switching operation. Consequently, the user can easily and reliably carry out switch operations.

The switch device of the present invention is applied to a vehicle steering switch unit. The switch device comprises a first switch section, and a second switch section, both of which are affixed to a steering pad. The first witch section has a stationary contact portion and a movable contact portion. The second switch section is affixed to a movable member of the first switch section, and has a plurality of operating switches. The movable contact member and the second switch section operate integrally, and many functions are allocated to a small number of operating switches. Therefore, during driving, the user can easily operate the operating switches without looking at them.

The operating switches are ergonomically disposed, so that the user can operate them without looking at them. Thus, they can be more safely operated.

What is claimed is:

1. A switch device comprising:
   a first switch section having a first plurality of switches operated to carry out a switching operation by movement of a movable member, the movable member having a self-returning structure automatically returning the first switch section to a neutral position after operation; and
   a second switch section having a second plurality of operating switches mounted on the movable member;
   wherein when the first switch section is operated, a function provided by the second switch section is changed depending on the switching operation selected by the first switch section.

2. A switch device according to claim 1, wherein the first switch section is a slide switch section.

3. A switch device according to claim 1, wherein the first switch section is a rotary switch section.

4. A switch device according to claim 1, further comprising an operation switch for turning a power source on and off, wherein the switch device is used to operate an audio device.

5. A switch device comprising:
   a first switch section affixed to a steering pad, the first switch section including a plurality of stationary contact portions and a movable contact portion; and
   a second switch section affixed to a movable member provided at the first switch section, the second switch section including a plurality of operating switches, the movable member having a self-returning structure automatically returning the first switch section to a neutral position after operation;
   wherein the movable member and the second switch section move integrally; and
   wherein when the first switch section is operated, a function provided by the second switch section is changed depending on the switching operation selected by the first switch section.

6. A switch device according to claim 5, wherein the second switch section is provided at an upper side of the steering pad.

7. A switch device according to claim 6, wherein the movable member and the second switch section are operated in a direction parallel to the upper side of the steering pad.

8. A switch device according to claim 5, wherein the movable member and the second switch section are operated in a direction parallel to an upper side of the steering pad.

9. A switch device according to claim 5, wherein the first switch section is a slide switch section.

10. A switch device according to claim 5, wherein the first switch section is a rotary switch section.

11. A switch device according to claim 5, further comprising an operation switch for turning a power source on and off, wherein the switch device is used to operate an audio device.

* * * * *